United States Patent
Durbin

(10) Patent No.: US 7,185,819 B2
(45) Date of Patent: Mar. 6, 2007

(54) READER FOR DECODING TWO-DIMENSIONAL OPTICALLY READABLE INFORMATION

(75) Inventor: Dennis A. Durbin, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 10/807,519

(22) Filed: Mar. 23, 2004

(65) Prior Publication Data

US 2005/0040239 A1    Feb. 24, 2005

Related U.S. Application Data

(60) Division of application No. 10/701,199, filed on Nov. 4, 2003, which is a continuation of application No. 09/961,697, filed on Sep. 24, 2001, now Pat. No. 6,641,046, which is a continuation of application No. 09/170,689, filed on Oct. 13, 1998, now Pat. No. 6,330,975, which is a continuation of application No. 08/703,564, filed on Aug. 27, 1996, now Pat. No. 5,821,523, which is a continuation-in-part of application No. 08/461,605, filed on Jun. 5, 1995, now Pat. No. 5,902,988, which is a continuation of application No. 08/277,132, filed on Jul. 19, 1994, now abandoned, which is a continuation of application No. 07/919,488, filed on Jul. 27, 1992, now abandoned, which is a continuation-in-part of application No. 07/889,705, filed on May 26, 1992, now abandoned, application No. 08/284,883, filed on Jul. 28, 1994, now Pat. No. 5,414,251, said application No. 07/889,705.

(60) Provisional application No. 07/849,771, filed on Mar. 12, 1992, now abandoned.

(51) Int. Cl.
*G06K 7/10* (2006.01)

(52) U.S. Cl. .............................. 235/462.45; 235/462.24

(58) Field of Classification Search ........... 235/462.01, 235/462.09, 462.2, 462.22, 462.11, 462.24, 235/462.45

See application file for complete search history.

(56) References Cited

U.S. PATENT DOCUMENTS

| | | | | |
|---|---|---|---|---|
| 4,656,524 A | * | 4/1987 | Norris et al. | 358/401 |
| 5,396,054 A | * | 3/1995 | Krichever et al. | 235/462.1 |
| 5,517,587 A | * | 5/1996 | Baker et al. | 382/296 |
| 5,591,952 A | * | 1/1997 | Krichever et al. | 235/462.11 |
| 5,702,059 A | * | 12/1997 | Chu et al. | 235/472.01 |
| 5,773,806 A | * | 6/1998 | Longacre, Jr. | 235/462.1 |
| 5,929,421 A | * | 7/1999 | Cherry et al. | 235/462.12 |
| 6,749,110 B2 | * | 6/2004 | Hecht | 235/462.22 |

* cited by examiner

*Primary Examiner*—Ahshik Kim
(74) *Attorney, Agent, or Firm*—Shook, Hardy & Bacon LLP

(57) ABSTRACT

An apparatus and method for reading optical information including a photosensitive system oriented to capture optical information. Also included is an optical system focusing optical information onto the photosensitive system, and a display oriented to display optical information captured by the photosensitive system. The apparatus also includes a portable, hand-held housing.

21 Claims, 6 Drawing Sheets

READER FOR DECODING TWO-DIMENSIONAL OPTICALLY READABLE INFORMATION

CROSS REFERENCE TO RELATED APPLICATIONS

The present application is a division of U.S. application Ser. No. 10/701,199 filed Nov. 4, 2003 which is a continuation of U.S. application Ser. No. 09/961,697 filed Sep. 24, 2001, now U.S. Pat. No. 6,641,046, which is a continuation of U.S. application Ser. No. 09/170,689 filed Oct. 13, 1998, now U.S. Pat. No. 6,330,975 issued Dec. 18, 2001, which is a continuation of application Ser. No. 08/703,564 filed Aug. 27, 1996, now U.S. Pat. No. 5,821,523 issued Oct. 13, 1998, which is a continuation-in-part of application Ser. No. 08/461,605 filed Jun. 5, 1995, now U.S. Pat. No. 5,902,988 issued May 11, 1999, which is a continuation of U.S. application Ser. No. 08/277,132 filed Jul. 19, 1994, now abandoned, which is itself a continuation of U.S. application Ser. No. 07/919,488 filed Jul. 27, 1992, now abandoned, which is a continuation-in-part of two applications: (1) U.S. application Ser. No. 07/849,771 filed Mar. 12, 1992, now abandoned; and (2) U.S. application Ser. No. 07/889,705 filed May 26, 1992, now abandoned. The U.S. application Ser. No. 07/889,705 is a continuation-in-part of application Ser. No. 07/849,771. Application Ser. No. 08/284,883 filed Jul. 28, 1994, now U.S. Pat. No. 5,414,251 issued May 9, 1995, is a continuation of the application Ser. No. 07/849,771.

INCORPORATION BY REFERENCE

The patent applications relied upon in the section entitled "Cross References to Related Applications" which were filed on or before Jun. 5, 1995, and U.S. Pat. Nos. 5,821,523 and 5,902,988, are hereby incorporated herein by reference in their entirety, including original claims and incorporated material.

BACKGROUND OF THE INVENTION

1. Technical Field

The present invention is directed to optical information readers and particularly to readers adapted to selectively decode two-dimensional optical information sets.

2. Description of the Prior Art

Conventional bar code symbols have small data storage capabilities. This reduces the utility of conventional bar code scanner and reader systems. For example, the 11 digit Uniform Pricing Code found on most supermarket items acts as an identifying number which may be utilized to access information in a database. Codes of this type do not carry information along their vertical axis, and are therefore, less prone to skewing errors during decoding.

Two-dimensional bar code symbols or "portable data files" have recently been developed. With codes of this type access to a database is not required since the code contains the information which would normally be keyed for in a database. Since reliance on a database is not required, information may be accessed and exchanged more readily and reliably. However, in order to decode two-dimensional codes, a more sophisticated apparatus is required. This is primarily true since normal vertical code redundancy is not present, making code registration, orientation and condition very important.

Several two-dimensional coding standards have been proposed, e.g., Code 49, 16K, Identicode MLC-2D, and Code PDF417. While such codes are capable of storing information such as price, name of product, manufacturer, weight, expiration date, inventory data, shipping information, and the like; apparatus which assist the user in aiming and decoding two-dimensional codes are not currently available. For example, two-dimensional codes might consist of a stack of conventional linear codes. Each line may contain different information, such as (1) pricing information, (2) product name, (3) name of the manufacturer, (4) product weight, (5) expiration date, (6) inventory data, (7) shipping information, and the like. Additionally, a user may require the ability to selectively store or send portions of the decoded bar code symbol.

Objects of the Invention

Therefore, a principal object of the present invention is to provide a reader adapted to selectively read two-dimensional optical information sets.

Another object of the present invention is to provide a reader adapted to selectively read two-dimensional optical information sets in ambient light.

Another object of the present invention is to provide a reader adapted to selectively read two-dimensional optical information sets from a wide range of distances.

Another object of the present invention is to provide a reader adapted to selectively read optical information while assisting a user in aiming the reader.

Another object of the present invention is to provide a reader adapted to selectively read two-dimensional optical information sets which is economical to manufacture and durable in use.

Another object of the present invention is to provide a reader adapted to selectively read two-dimensional optical information sets which is efficient in operation, simple in construction, easy to use and trouble free. These and other objects will be apparent to those skilled in the art from the following disclosure.

SUMMARY OF THE INVENTION

The present invention discloses a novel reader for reading optical information. In one exemplary embodiment the invention includes a housing for supporting a photosensitive array associated with an optical string means which is adapted to focus optical information on the array. Also provided are array and optical string control means for controlling the array and optical string such that the output of selected images on the array may be processed via pattern recognition means. Images on the array may be presented to the user by a display means. Images recognized to contain decodable optical information may be displayed and highlighted on the display means. In this fashion a user is assisted in aiming, recognizing and confirming the decodability of a coded image incident on the array.

BRIEF DESCRIPTION OF THE DRAWINGS

Other objects and advantages of the invention will be apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
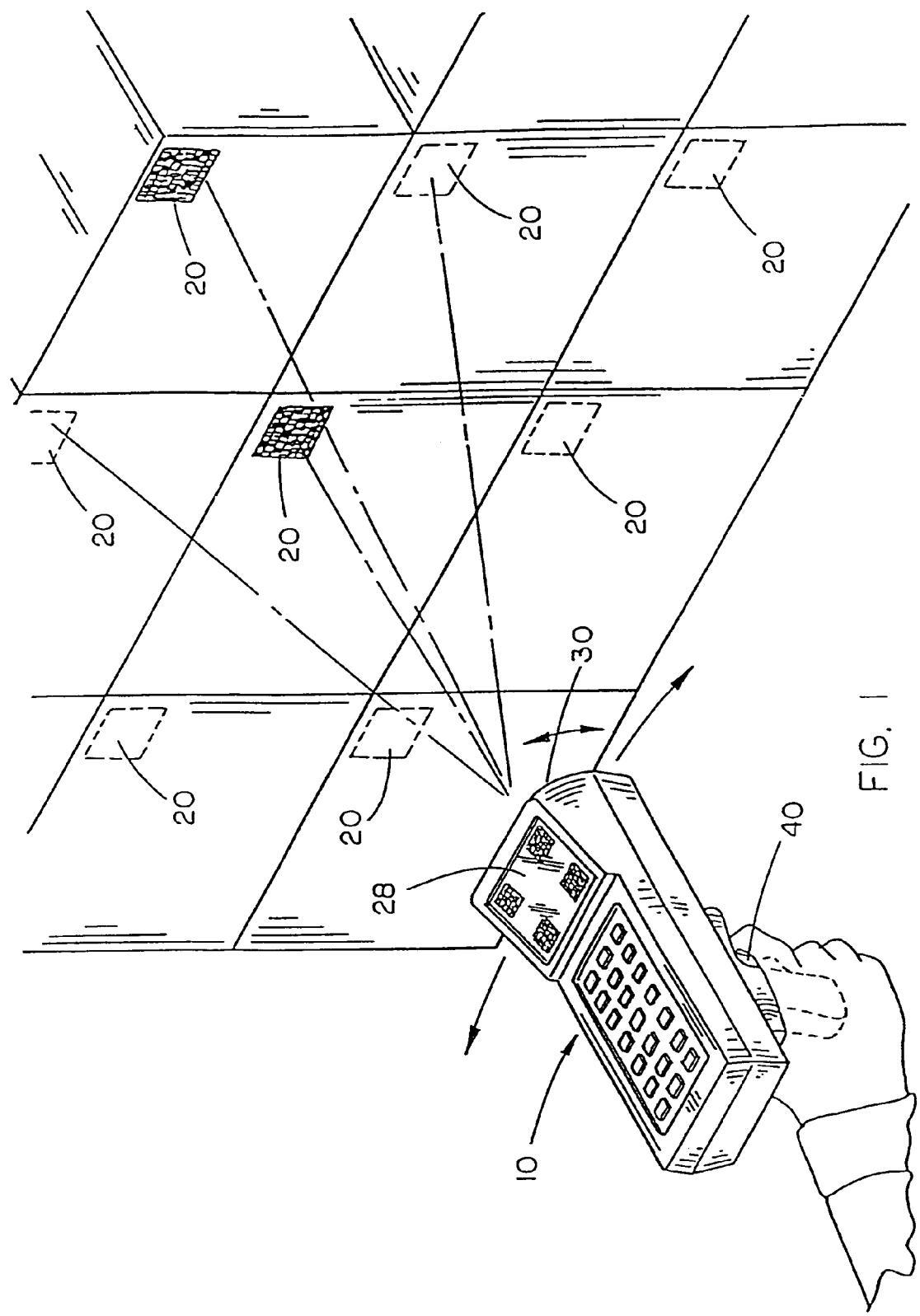
FIG. 1 is a perspective view of a preferred embodiment of the two-dimensional optical information reader showing a user being assisted by the display of the reader in aiming.
Figure 3:
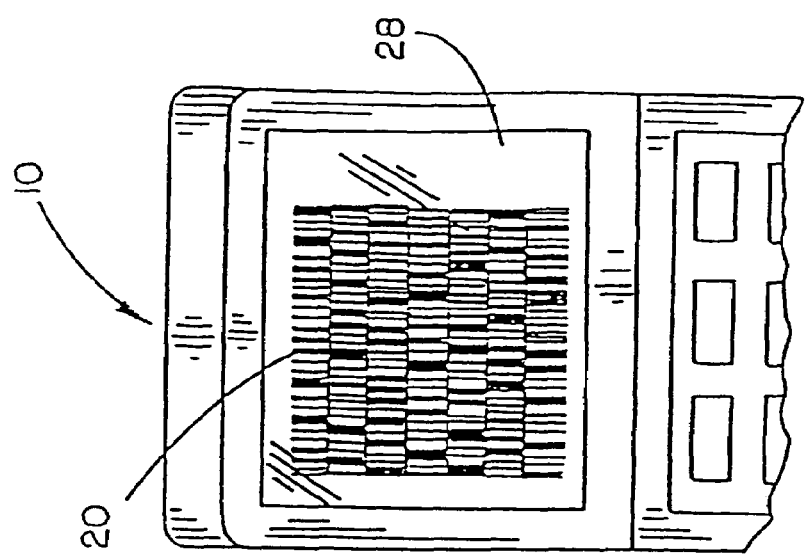
FIG. 3 is a partial top perspective view of the reader illustrating the display wherein the display indicates to a user that a two-dimensional, decodable bar code symbol is centered in view and available for reading.
Figure 2:
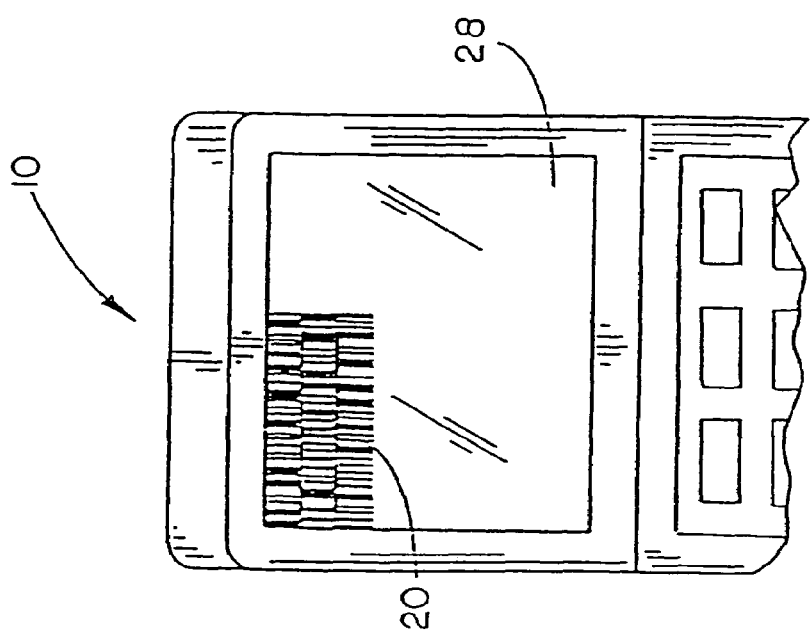
FIG. 2 is a partial top perspective view of the reader illustrating the display wherein the display indicates to a user that a two-dimensional, decodable, bar code symbol may be read if the user adjusts the aim of the reader to the left and above.
Figure 4:
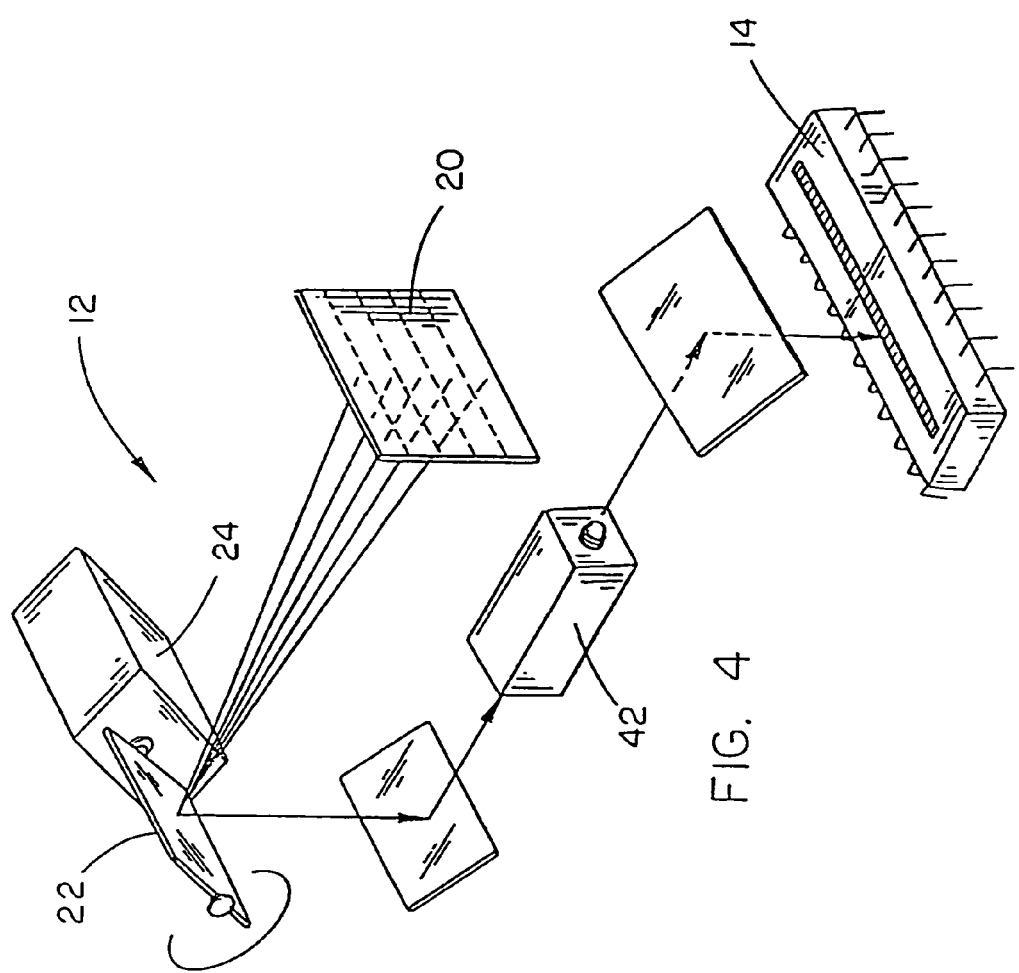
FIG. 4 is a highly diagrammatic perspective view of the image capturing elements of a linear array exemplary embodiment of the present invention.
Figure 5:
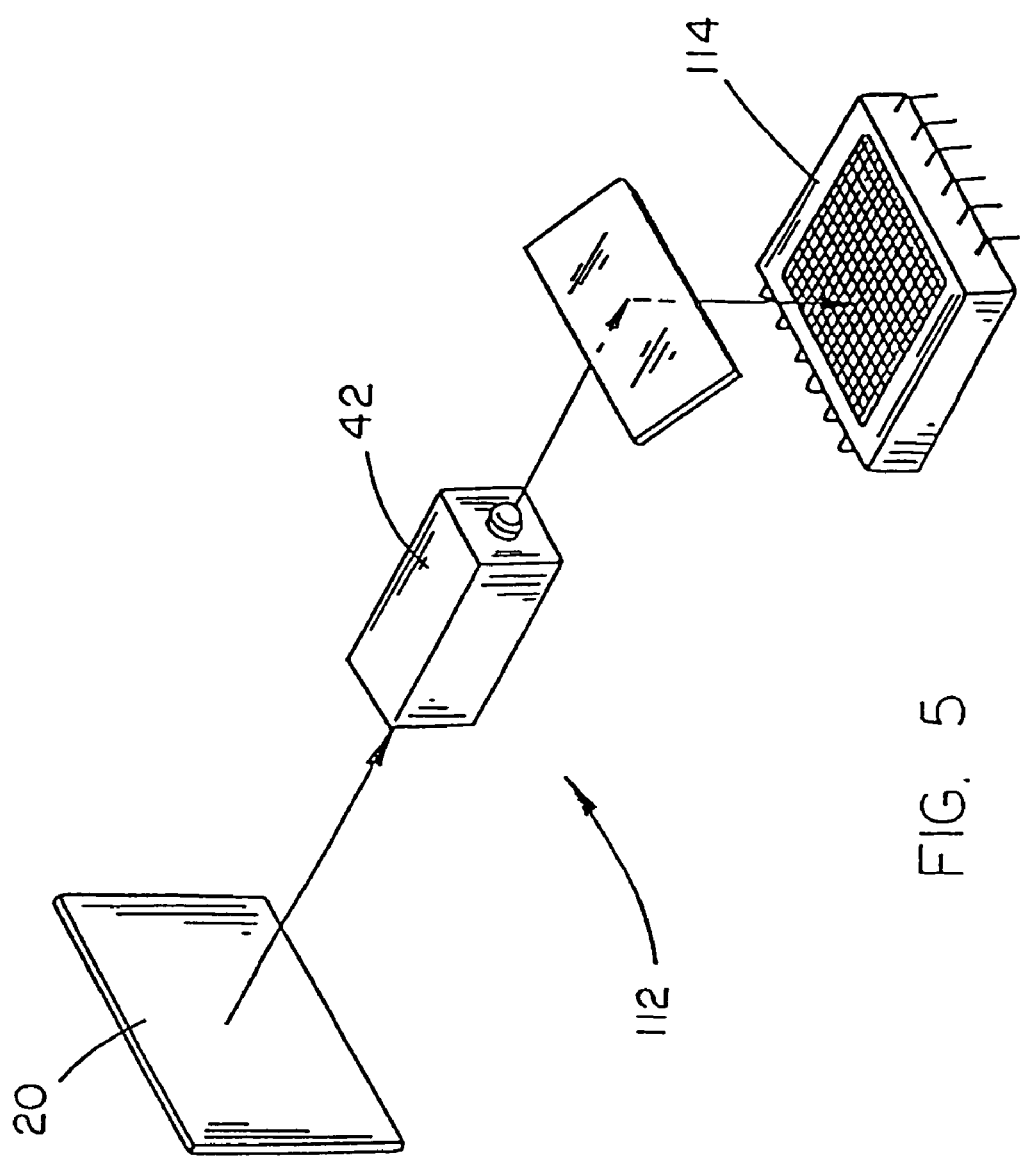
FIG. 5 is a highly diagrammatic perspective view of the image capturing elements of a two-dimensional array exemplary embodiment of the present invention.
Figure 6:
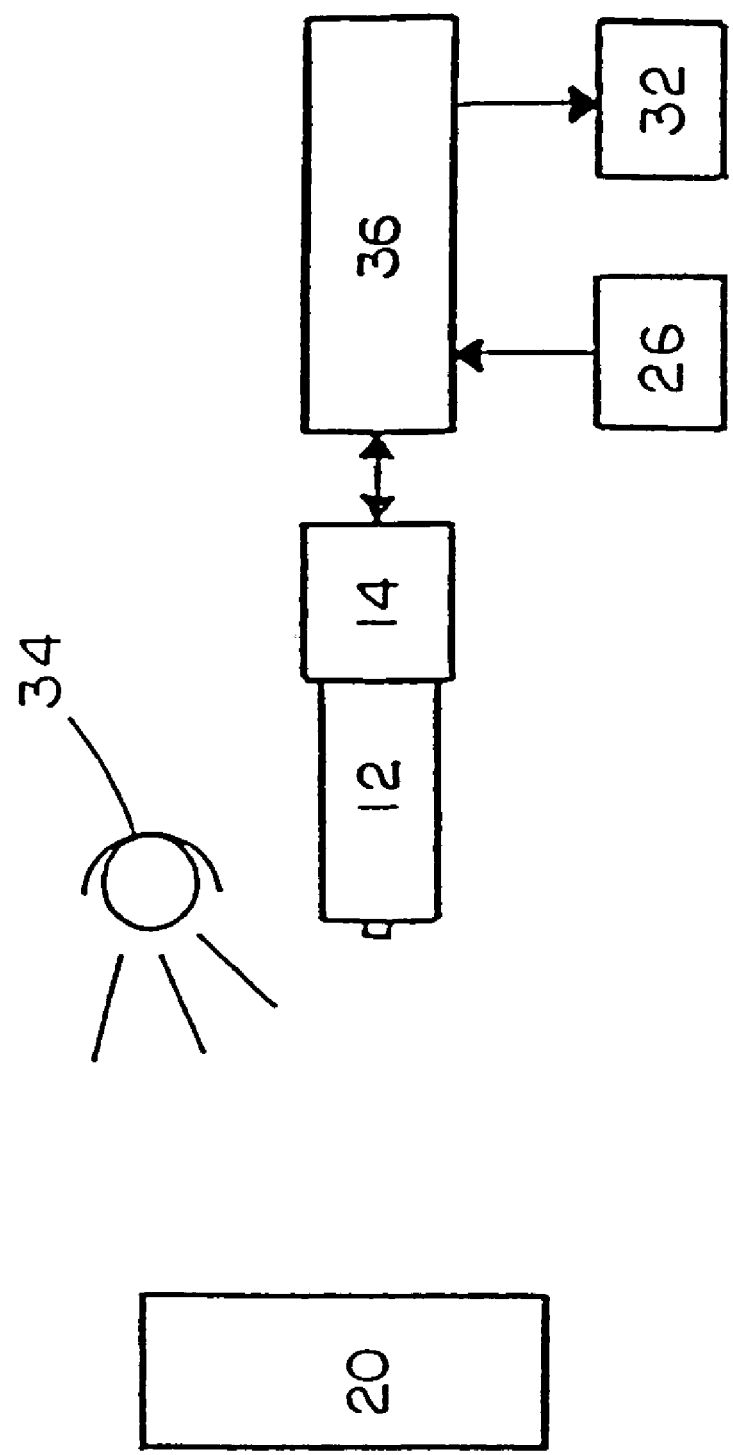
FIG. 6 is a block diagram illustrating the various components of the present invention.
Figure 7:
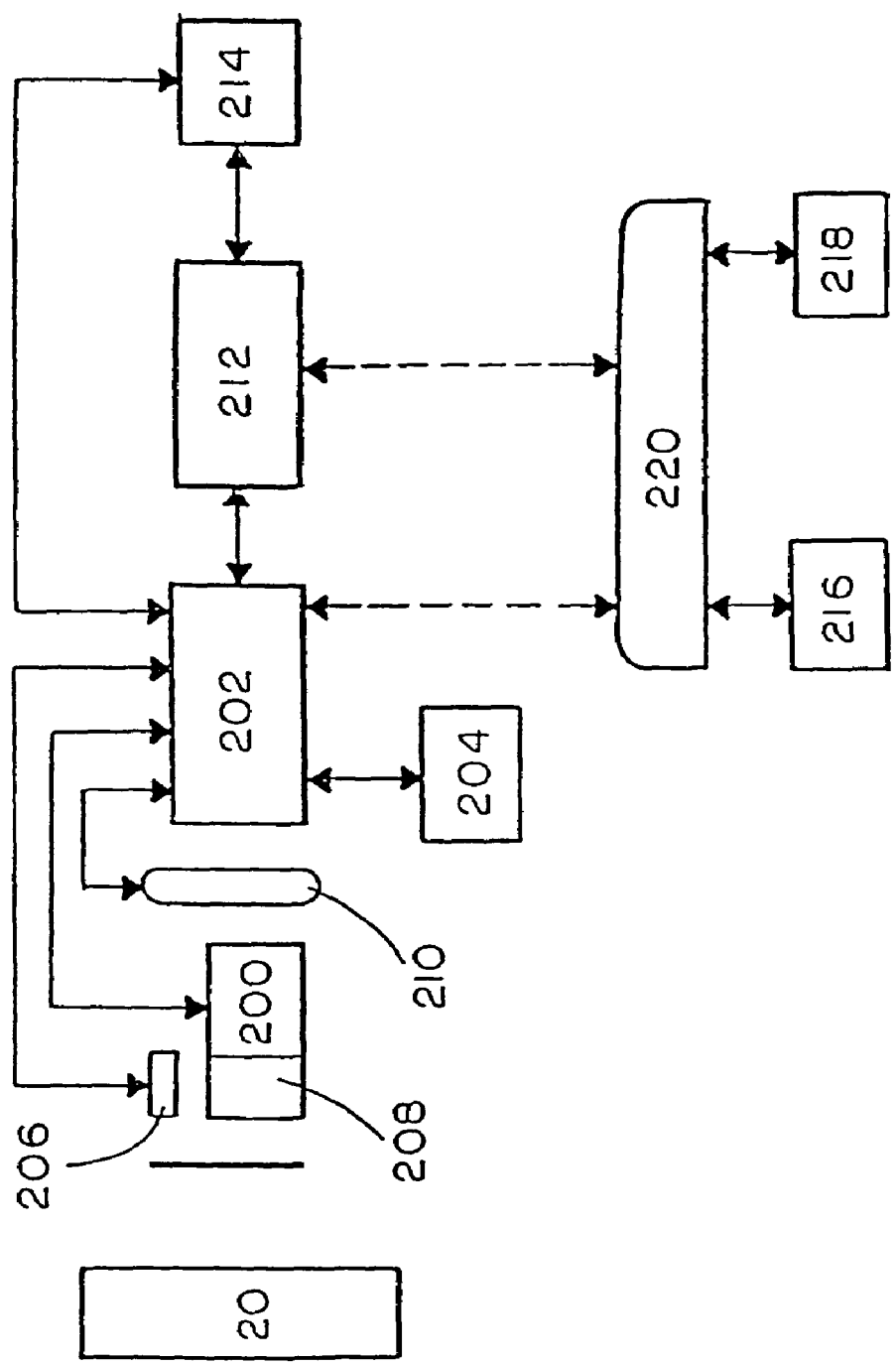
FIG. 7 is a more detailed diagram illustrating the various components of the present invention.

The detailed description of FIGS. 1–7 as found in U.S. Pat. No. 5,902,988 from col. 2, line 63, to col. 7, line 67, is hereby incorporated herein by reference in its entirety.

The detailed description and drawings of U.S. Pat. No. 5,821,523 are also incorporated herein by reference in their entirety as showing in further embodiments within the scope of the present invention.

INCORPORATION BY REFERENCE

The present invention may be construed for use in a docking type system for recharging/communicating with the apparatus disclosed herein. A docking station which might be adapted for use with the present invention is disclosed in U.S. application Ser. No. 07/451,322, filed Dec. 15, 1989, (now U.S. Pat. No. 5,227,614), which application is incorporated herein by reference in its entirety as illustrating arrangements which may be embodied in a peripheral shell 260 (FIG. 10; Ser. No. 07/451,322). Likewise, the disclosure of U.S. Pat. No. 4,877,949, issued Oct. 31, 1989, is also incorporated herein by reference, in its entirety, as illustrating means for focusing an image of optically readable information over a substantial range of distances. Also incorporated herein by reference is U.S. application Ser. No. 07/451,322, filed Dec. 15, 1989, (now U.S. Pat. No. 5,227,614) as illustrating a display 14 (FIGS. 13 and 14) adapted to assist a user of an apparatus in reading optically readable information. Finally, also incorporated in its entirety herein by reference is U.S. application Ser. No. 07/143,921, filed Jan. 14, 1988, as illustrating optically readable information digitizing and decoding means (FIGS. 7 through 18).

While the invention has been described with a certain degree of particularity, it is manifest that many changes may be made in the details of construction and the arrangement of components without departing from the spirit and scope of the disclosure. It is understood that the invention is not limited to the embodiments set forth herein for purposes of exemplification, but is to be limited only by the scope of the appended claims including the full range of equivalency to which each element thereof is entitled.

Thus, there has been shown and described an improved optical information reader which accomplishes at least all of the stated objects.

I claim as my invention:

1. A method for capturing optical information, comprising:

directing a reader at optical information to be read, wherein said reader includes:

a photosensitive subsystem to capture optical information;

an optical subsystem positioned relative to said photosensitive subsystem so as to direct optical information from a field of view onto said photosensitive subsystem; and a processor subsystem coupled with said photosensitive subsystem to process output from said photosensitive subsystem; and selecting by means of the processor subsystem a region of the field of view to be processed by the processor subsystem; and wherein the reader further comprises a user feedback subsystem to advise a user of the region comprising two-dimensional optical information in the field of view which has been selected for processing by the processor subsystem, said method further comprising presenting to the user the selected region by means of the user feedback subsystem.

2. The method of claim 1, wherein a housing of a size and shape suited for hand-held operation, is directed to place a desired target within the field of view.

3. The method of claim 1, wherein said photosensitive subsystem comprises a one-dimensional photosensitive array.

4. The method of claim 3, wherein said reader further comprises a rastering device configured to raster one-dimensional image segments of two-dimensional optical information onto the one-dimension photosensitive array.

5. The method of claim 1, wherein said photosensitive subsystem comprises a two-dimensional photosensitive array.

6. The method of claim 1, with the reader further comprising a zoom subsystem, said method comprising enlarging a selected region within the field of view by means of the zoom subsystem.

7. The method of claim 1, with the reader further comprising a focusing subsystem configured to variably focus two-dimensional optical information onto the photosensitive subsystem.

8. The method of claim 1, wherein the reader further comprises a photosensitive array control subsystem, coupled with said photosensitive subsystem, for reading out only pixels of the photosensitive subsystem which correspond to the selected region of the field of view.

9. The method of claim 1, wherein the reader further comprises: a pattern recognition subsystem configured to assist the processor subsystem in recognizing two-dimensional optical information, said method further comprising utilizing the pattern recognition subsystem to assist in selecting a region of the field of view to be processed.

10. The method of claim 9, wherein the pattern recognition subsystem comprises a neural network.

11. The method of claim 1, further comprising the step of removing user hand jitter from two-dimensional information displayed to the user.

12. The method of claim 1, wherein the reader further comprises a decoding subsystem configured to decode two-dimensional optical information, said method comprising utilizing the decoding subsystem to decode a region of the field of view comprising two-dimensional optical information.

13. A system for reading optical information, comprising:
a photosensitive subsystem for capturing optical information during a capture operation;
an optical subsystem associated with said photosensitive subsystem for directing optical information from a field of view onto said photosensitive system;
a housing, supporting said optical subsystem, said housing constructed to be directable toward a field of view containing optical information to be captured;
wherein a processing subsystem enables selection of a region of field of view for processing during a capture operation; and
a user feedback subsystem to facilitate user selection of a region of the field of view for processing during a capture operation.

14. The system of claim 13, further comprising a portable reader having a power supply for providing operating power, and for manipulation to direct the optical subsystem to place a desired target within the field of view.

15. The system of claim 13, further comprising:
a pattern recognition subsystem configured to assist a user in selecting a region of the field of view for processing during a capture operation.

16. The system of claim 13, wherein said photosensitive subsystem comprises a one-dimensional array of photosensitive pixels.

17. The system of claim 16, further comprising a raster device configured to raster one-dimensional image segments of two-dimensional optical indicia onto said one-dimensional array.

18. The system of claim 13, wherein said photosensitive subsystem is a two-dimensional array of photosensitive pixels.

19. The system of claim 13, further comprising a zoom subsystem.

20. The system of claim 13, further comprising a focusing subsystem configured to variably focus optical information onto said photosensitive subsystem.

21. A two-dimensional optical information reading system, comprising:
means for sensing two-dimensional optical information;
means for directing two-dimensional optical information onto said means for sensing two-dimensional optical information;
means for housing said means for directing, said means for housing constructed to enable the reading system to be directed by a user toward a field of view containing optical information to be captured;
means for processing, coupled with said means for sensing two-dimensional optical information, to process output from said means for sensing two-dimensional optical information;
means for selecting a region of a field of view of the means for directing, for processing by the means for processing; and
means for providing user feedback to facilitate user selection of a region of the field of view for processing during a capture operation.

* * * * *